United States Patent [19]
Durant et al.

[11] Patent Number: 5,394,701
[45] Date of Patent: Mar. 7, 1995

[54] BRAKE VALVE WITH PREFILL CHAMBER UNLOADING VALVE

[75] Inventors: Douglas M. Durant, Waterloo; Larry M. Delfs; Derek M. Eagles, both of Cedar Falls, all of Iowa

[73] Assignee: Deere & Company, Moline, Ill.

[21] Appl. No.: 201,549

[22] Filed: Feb. 25, 1994

[51] Int. Cl.⁶ .......................... F15B 7/00; B60T 11/26
[52] U.S. Cl. ........................................ 60/533; 60/581; 60/585; 60/591
[58] Field of Search ............. 60/533, 547.1, 549, 60/561, 565, 581, 584, 585, 588, 589, 591

[56] References Cited

U.S. PATENT DOCUMENTS

| | | | |
|---|---|---|---|
| 4,408,805 | 10/1983 | Edwards et al. | 60/581 X |
| 4,463,562 | 8/1984 | Taft | 60/581 X |
| 4,464,899 | 8/1984 | Myers et al. | 60/553 X |
| 4,534,171 | 8/1985 | Leiber | 60/553 X |
| 4,624,108 | 11/1986 | Leiber | 60/581 X |
| 4,641,497 | 2/1987 | Kervagoret | 60/565 X |
| 4,738,109 | 4/1988 | Miller et al. | |
| 5,221,126 | 6/1993 | Inoue | 60/547.1 X |

OTHER PUBLICATIONS

Eagles, D. M., "Hydraulic System of John Deere 7000 Series Tractors", Paper No. 931613, 14 Dec. 1993.

*Primary Examiner*—Edward K. Look
*Assistant Examiner*—Hoang Nguyen

[57] ABSTRACT

Left and right two stage brake valves communicate fluid pressure to left and right brake mechanisms, each brake valve having an inlet for receiving pressurized brake fluid, a reservoir, a stepped bore and a stepped piston. The stepped bore and the stepped piston forming a high volume prefill chamber and a high pressure chamber. A prefill drain valve communicates the prefill chambers to the reservoir only when pump pressure is available at the inlet and blocks communication between the left and right prefill chambers and between the prefill chambers and a reservoir when pump pressure is not available at the inlet.

13 Claims, 3 Drawing Sheets

BRAKE VALVE WITH PREFILL CHAMBER UNLOADING VALVE

BACKGROUND OF THE INVENTION

The invention relates to a brake control valve assembly which includes a pair of dual stage brake control valves.

A known dual stage brake control valve is described in U.S. Pat. No. 4,738,109, issued 19 Apr. 1988 and assigned to the assignee of this application. Such a brake valve provides the capability for manual braking when pump pressure is not available at the brake valve pump pressure inlet. This capability is achieved with a dual stage valve arrangement that includes a prefill piston and a high pressure piston. The prefill piston provides the large volume of oil and associated low hydraulic pressure required for engagement of the rear axle brake components. Once this volume is satisfied, the brake valve transitions from the larger prefill piston diameter to the smaller diameter high pressure piston in order to generate higher pressures required for braking.

With pump pressure available at the brake valve pump inlet, application of the brake valve (prefill piston/high pressure piston) requires only a small amount of travel from the neutral position to the pressure metering position. However, during this travel, pressure is generated in the prefill chamber, resulting in a heavy pedal feel. The heavy pedal feel and associated higher pedal force required to apply the brake results in reduced control of the brake pressure due to the eventual pressure decay of the prefill chamber. This heavy pedal feel is more noticeable in cold weather conditions due to the increased pressure decay time.

SUMMARY OF THE INVENTION

Accordingly, an object of this invention is to provide a brake valve which does not have a heavy pedal feel.

A further object of the invention is to provide such a brake valve which maintains isolation between the left and right sides of the brake valve as preferred for single pedal manual braking.

These and other objects are achieved by the present invention, wherein left and right two stage brake valves communicate fluid pressure to left and right brake mechanisms, each brake valve having an inlet for receiving pressurized brake fluid, a reservoir, a stepped bore and a stepped piston. The stepped bore and the stepped piston forming a high volume prefill chamber and a high pressure chamber. A prefill drain valve communicates the prefill chambers to the reservoir only when pump pressure is available at the inlet and blocks communication between the left and right prefill chambers and between the prefill chambers and a reservoir when pump pressure is not available at the inlet. The prefill drain valve preferably comprises a three-way, two-position spool valve.

DETAILED DESCRIPTION

Figure 1:
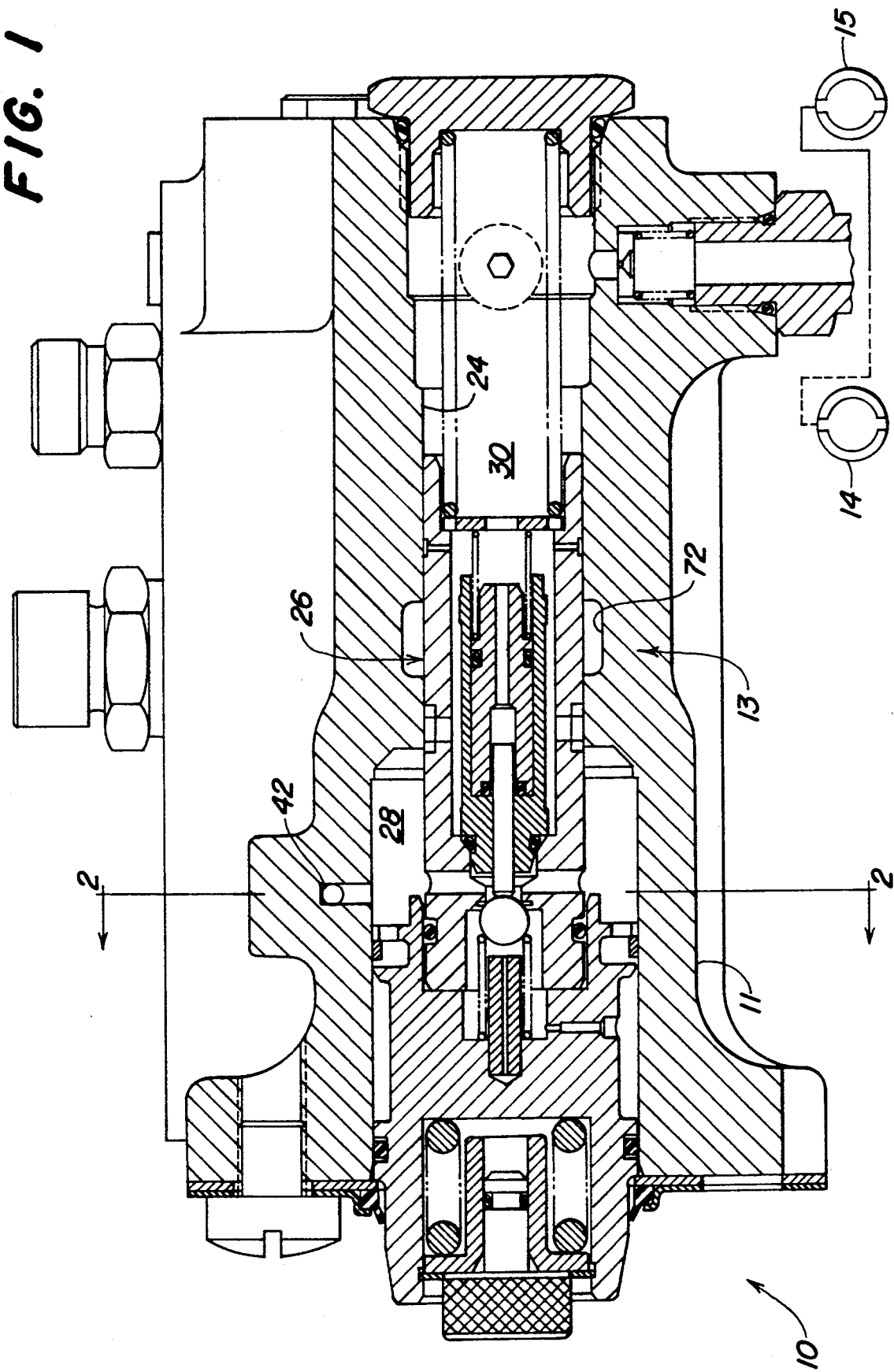
FIG. 1 is a cross-sectional view of a two-stage brake valve.
Figure 2:
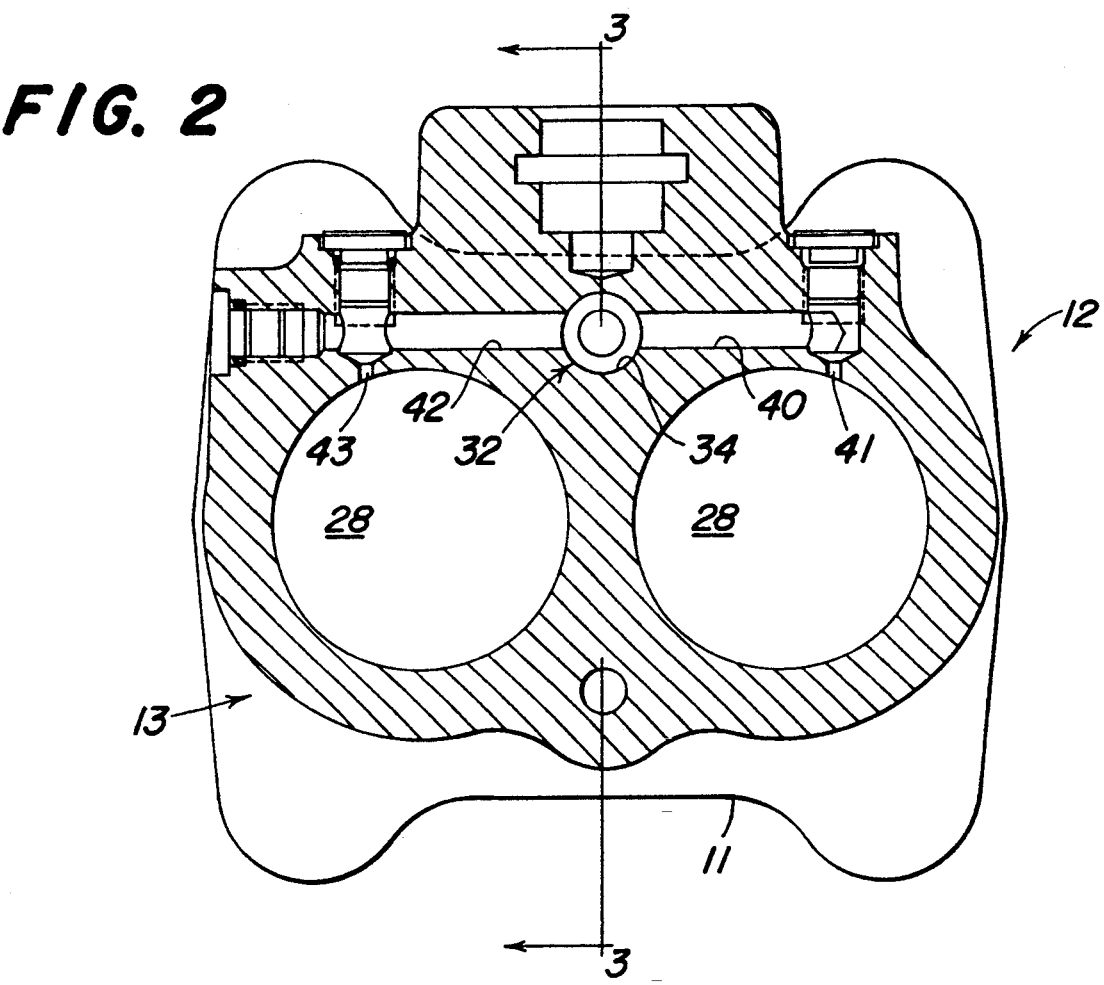
FIG. 2 is a sectional view taken along lines 2—2 of FIG. 1.
Figure 3:
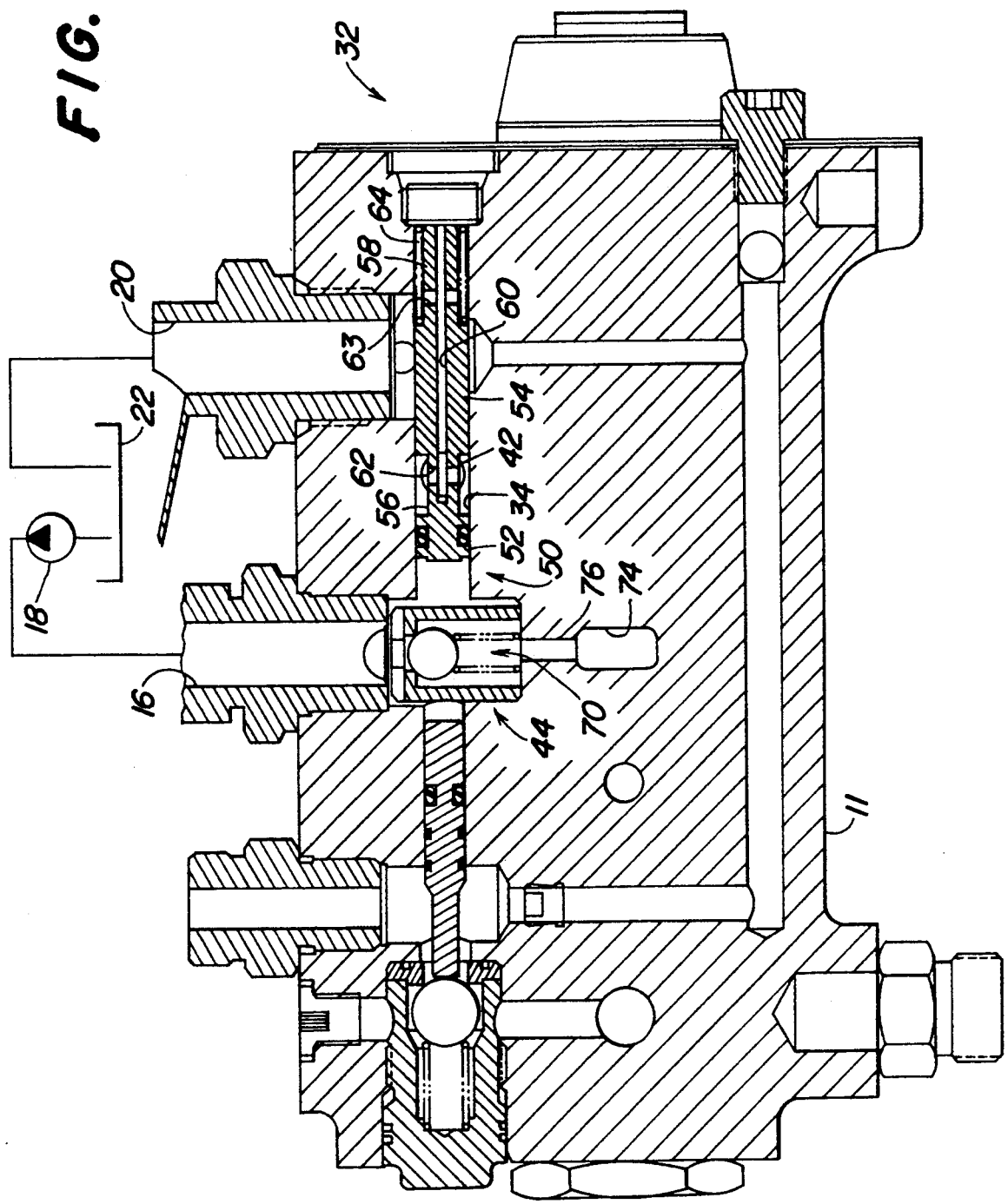
FIG. 3 is a sectional view taken along line 3—3 of FIG. 2.

Referring to FIGS. 1, 2 and 3, there is shown one side of a dual two stage brake valve 10 a housing 11 which encloses a left two stage brake valve 12 and a right two stage brake valve 13 for communicating fluid pressure to left and right brake mechanism 14, 15. Each brake valve has an inlet 16 for receiving pressurized brake fluid from a pump 18, a reservoir port 20 for communicating with a reservoir 22, a stepped bore 24 and a stepped piston 26. The stepped bore 24 and the stepped piston 26 form a high volume prefill chamber 28 and a high pressure chamber 30. The structure described so far is conventional and is similar to that which is described in the above mentioned U.S. Pat. No. 4,738,109.

According to the present invention, the brake valve also includes a prefill drain valve 32. The prefill drain valve 32 communicates the prefill chambers 28 to the reservoir port 20 only when the inlet 16 is pressurized. The prefill drain valve 32 preferably comprises a three-way, two-position spool valve. As best seen in FIGS. 2 and 3, a prefill drain valve bore 34 is formed in the housing 11 between the left and right brake valves 12 and 13. The inlet 16 communicates the pump 18 to the bore 34. The reservoir port 20 communicates the bore 34 with the reservoir 22. As best seen in FIG. 2, passages 40, 41 communicate the bore 34 to the left prefill chamber 28 and passages 42, 43 communicate the bore 34 to the right prefill chamber 28.

Figure 4:
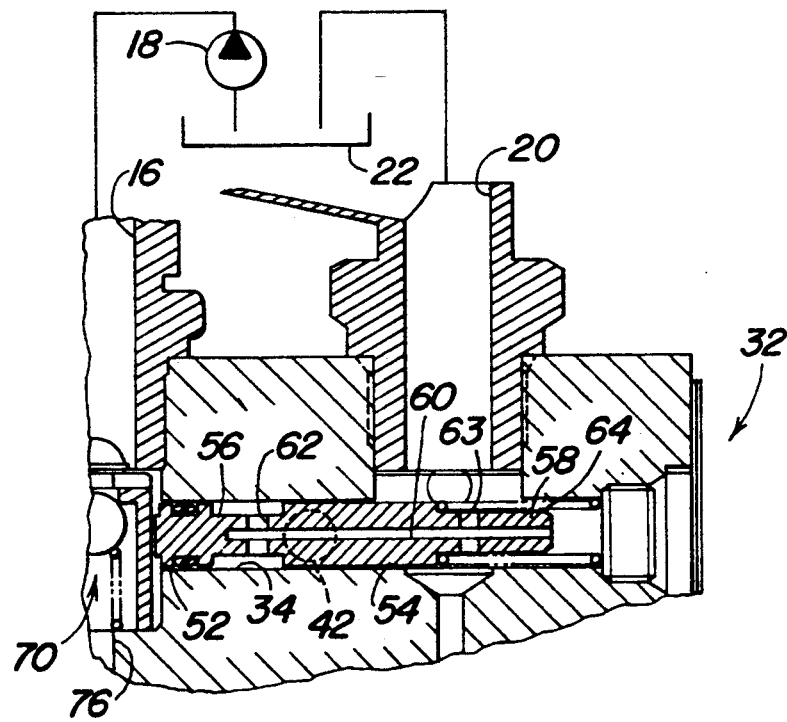
FIG. 4 is a view of a portion of FIG. 3 showing the prefill valve in another position.

A valve member 50 is slidable in the bore 34. The valve member 50 includes a first land 52 with an O-ring seal, a second land 54 separated from land 52 by an annular groove 56 and a stem 58 which projects axially from land 54. The axial end of land 52 is exposed to the pressure at inlet port 16. A blind central axial bore 60 extends from a location within the boundaries of groove 56, through land 54 and out the end of stem 58. A radial bore 62 communicates groove 56 to the blind bore 60. A radial bore 63 communicates blind bore 60 to the reservoir port 20. A spring 64 surrounds stem 58 and engages the land 54 and is biased to urge the valve member 50 to the position shown in FIG. 4, wherein the land 54 closes communication between cross bores 40 and 42 and bore 34, thus closing communication between the prefill chambers 28 and the reservoir 22. In this position, communication is also closed between the cross bores 40 and 42, thus isolating the left and right prefill chambers from each other. This prevents reduced manual operation of either one of the left and right brake valves when operated independently. When the inlet 16 is pressurized the valve member 50 moves to the position shown in FIG. 3 and communicates the prefill chambers 28 to the reservoir port 20 via passage 42, radial bore 62, axial bore 60, radial bore 63 and port 20.

A check valve 70 in the inlet 16 is communicated with annular grooves 72 in each of the brake valve 12, 13 via passages 74 and 76. Check valve 70 closes when pump pressure is absent to prevent leakage of brake fluid from high pressure chamber 30 via groove 72 when brake pressure is generated in chamber 30 by manual forces applied to the stepped piston 26.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A two stage brake valve for communicating fluid pressure to a brake mechanism, the brake valve having an inlet for receiving pressurized brake fluid from a pump, a reservoir port, a stepped bore and a stepped piston, the stepped bore and the stepped piston forming a high volume prefill chamber and a high pressure chamber, characterized by:
   a prefill drain valve which communicates the prefill chamber to the reservoir only when pump pressure is available at the inlet.

2. The brake valve of claim 1, wherein:
   the prefill drain valve comprises a three-way, two-position spool valve.

3. The brake valve of claim 1, wherein:
   a prefill drain valve bore is formed in a housing of the brake valve;
   an inlet passage communicates fluid pressure from the inlet to an inlet end of the prefill drain valve bore;
   a prefill passage communicates the prefill chamber to the prefill drain valve bore;
   a drain passage communicates the reservoir to the prefill drain valve bore;
   a valve member is slidable in the prefill drain valve bore, the valve member comprising first and second lands separated by an annular groove, an end of the first land being exposed to fluid pressure in the inlet end of the prefill drain valve bore, a valve passage extending through the valve member and communicating the groove with an end of the second land which faces away from the first land; and
   a spring engaging the valve member and biased to urge the valve member to a position wherein the second land blocks the prefill passage and closes communication between the prefill passage and the drain passage when pump pressure is not available at the inlet, the valve member moving against the bias of the spring to a position wherein communication is open between the prefill passage and the drain passage via the groove, the valve passage and a portion of the prefill drain valve bore when pump pressure is available at the inlet.

4. The brake valve of claim 3, wherein the valve member further comprises:
   a stem projecting from the second land, the valve passage extending through the valve member and the stem and communicating the groove with an opening in an end of the stem, the stem being received by the spring.

5. The brake valve of claim 3, wherein the valve passage comprises:
   a blind axial bore extending into the valve member through the second land; and
   a radial bore extending from the groove to the blind bore.

6. A brake valve assembly having left and right two stage brake valves for communicating fluid pressure to respective left and right brake mechanisms, each two stage brake valve having an inlet for receiving pressurized brake fluid from a pump, a reservoir port, a stepped bore and a stepped piston, the left stepped bore and the left stepped piston forming a left high volume prefill chamber and left high pressure chamber, the right stepped bore and the right stepped piston forming a right high volume prefill chamber and a right high pressure chamber, characterized by:
   a prefill drain valve which communicates the prefill chambers to the reservoir only when pump pressure is available at the inlet.

7. The brake valve assembly of claim 6, wherein:
   the prefill drain valve comprises a three-way, two-position spool valve.

8. The brake valve assembly of claim 6, wherein:
   a prefill drain valve bore is formed in a housing of the brake valve assembly;
   an inlet passage communicates pump pressure from the inlet to an inlet end of the prefill drain valve bore;
   a left prefill passage communicates the left prefill chamber to one side of the prefill drain valve bore;
   a right prefill passage communicates the right prefill chamber to another side of the prefill drain valve bore;
   a drain passage communicates the reservoir to the prefill drain valve bore; and
   a valve member is slidable in the prefill drain valve bore, the valve member comprising first and second lands separated by an annular groove, and a stem which projects from the second land, an end of the first land being exposed to fluid pressure in the inlet end of the prefill drain valve bore, a valve passage extending through the valve member and communicating the groove with an opening in an end of the stem; and
   a spring engaging the valve member and biased to urge the valve member to a position wherein the second land blocks both prefill passage and closes communication between the prefill passages and the drain passage when pump pressure is not available at the inlet, the valve member moving against the bias of the spring to a position wherein communication is open between the prefill passage and the drain passage via the groove, the valve passage and a portion of the prefill drain valve bore surrounding the stem when pump pressure is available at the inlet.

9. The brake valve assembly of claim 8, wherein the valve member further comprises:
   a stem projecting from the second land, the valve passage extending through the valve member and the stem and communicating the groove with an opening in an end of the stem, the stem being received by the spring.

10. The brake valve assembly of claim 9, wherein the valve passage comprises:
    a blind central axial bore extending into the valve member through the stem and the second land; and
    a radial bore extending from the groove to the blind bore.

11. The brake valve assembly of claim 6, wherein:
    the prefill drain valve blocks communication between the prefill chambers and blocks communication between the prefill chambers and the reservoir when pump pressure is not available at the inlet.

12. A two stage brake valve for communicating fluid pressure to a brake mechanism, the brake valve having an inlet for receiving pressurized brake fluid from a pump, a reservoir port, a stepped bore and a stepped piston, the stepped bore and the stepped piston forming a high volume prefill chamber and a high pressure chamber, characterized by:
    a prefill drain valve which communicates the prefill chamber to the reservoir only when pump pressure is available at the inlet, the prefill drain valve comprising:

a prefill drain valve bore is formed in a housing of the brake valve;

an inlet passage communicates fluid pressure from the inlet to an inlet end of the prefill drain valve bore;

a prefill passage communicates the prefill chamber to the prefill drain valve bore;

a drain passage communicates the reservoir to the prefill drain valve bore;

a valve member is slidable in the prefill drain valve bore, the valve member comprising first and second lands separated by an annular groove, an end of the first land being exposed to fluid pressure in the inlet end of the prefill drain valve bore, a valve passage extending through the valve member and communicating the groove with an end of the second land which faces away from the first land; and a spring engaging the valve member and biased to urge the valve member to a position wherein the second land blocks the prefill passage and closes communication between the prefill passage and the drain passage when pump pressure is not available at the inlet, the valve member moving against the bias of the spring to a position wherein communication is open between the prefill passage and the drain passage via the groove, the valve passage and a portion of the prefill drain valve bore when pump pressure is available at the inlet.

13. A brake valve assembly having left and right two stage brake valves for communicating fluid pressure to respective left and right brake mechanisms, each two stage brake valve having an inlet for receiving pressurized brake fluid from a pump, a reservoir port, a stepped bore and a stepped piston, the left stepped bore and the left stepped piston forming a left high volume prefill chamber and left high pressure chamber, the right stepped bore and the right stepped piston forming a right high volume prefill chamber and a right high pressure chamber, characterized by:

a prefill drain valve which communicates the prefill chambers to the reservoir only when pump pressure is available at the inlet, the prefill drain valve comprising:

a prefill drain valve bore is formed in a housing of the brake valve assembly;

an inlet passage communicates pump pressure from the inlet to an inlet end of the prefill drain valve bore;

a left prefill passage communicates the left prefill chamber to one side of the prefill drain valve bore;

a right prefill passage communicates the right prefill chamber to another side of the prefill drain valve bore;

a drain passage communicates the reservoir to the prefill drain valve bore; and a valve member is slidable in the prefill drain valve bore, the valve member comprising first and second lands separated by an annular groove, and a stem which projects from the second land, an end of the first land being exposed to fluid pressure in the inlet end of the prefill drain valve bore, a valve passage extending through the valve member and communicating the groove with an opening in an end of the stem; and a spring engaging the valve member and biased to urge the valve member to a position wherein the second land blocks both prefill passage and closes communication between the prefill passages and the drain passage when pump pressure is not available at the inlet, the valve member moving against the bias of the spring to a position wherein communication is open between the prefill passage and the drain passage via the groove, the valve passage and a portion of the prefill drain valve bore surrounding the stem when pump pressure is available at the inlet.

* * * * *